(12) United States Patent
Robinson et al.

(10) Patent No.: US 9,929,816 B2
(45) Date of Patent: Mar. 27, 2018

(54) SIGNAL ANALYSIS FOR DETERMINING OUTDOOR ELECTRONIC UNIT CONFIGURATION

(71) Applicant: ARRIS Enterprises LLC, Suwanee, GA (US)

(72) Inventors: Andrew Robinson, San Diego, CA (US); William R. Doyle, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/165,359

(22) Filed: May 26, 2016

(65) Prior Publication Data

US 2016/0352438 A1 Dec. 1, 2016

Related U.S. Application Data

(60) Provisional application No. 62/168,243, filed on May 29, 2015.

(51) Int. Cl.
| | |
|---|---|
| *H04H 40/90* | (2008.01) |
| *H04B 17/00* | (2015.01) |
| *H04B 17/10* | (2015.01) |
| *H04N 7/20* | (2006.01) |
| *H04N 21/61* | (2011.01) |
| *H04B 17/309* | (2015.01) |
| *H04H 20/12* | (2008.01) |
| *H04N 21/438* | (2011.01) |

(52) U.S. Cl.
CPC ......... *H04B 17/104* (2015.01); *H04B 17/309* (2015.01); *H04H 20/12* (2013.01); *H04H 40/90* (2013.01); *H04N 7/20* (2013.01); *H04N 21/6143* (2013.01); *H04N 21/438* (2013.01)

(58) Field of Classification Search
CPC ...... H04B 17/309; H04H 20/12; H04H 40/90; H04N 21/6143; H04N 7/20
See application file for complete search history.

(56) References Cited

U.S. PATENT DOCUMENTS

| | | | | |
|---|---|---|---|---|
| 2009/0103596 | A1* | 4/2009 | Buer | H04B 1/40 375/222 |
| 2011/0016496 | A1* | 1/2011 | Popa | H04H 20/38 725/68 |
| 2015/0349417 | A1* | 12/2015 | Richards | H01Q 1/1257 342/352 |

* cited by examiner

*Primary Examiner* — Ross Varndell
(74) *Attorney, Agent, or Firm* — Bart A. Perkins (57) ABSTRACT

Methods, systems, and computer readable media can be operable to facilitate the determination of an outdoor electronic unit (ODU)-type based upon a signal analysis. A device may perform an analysis of a signal received from an ODU, wherein the analysis identifies one or more properties of the signal, the properties including a peak frequency of the signal. The device may then compare the identified signal properties to one or more properties of one or more predetermined spectral configurations, each spectral configuration being associated with an ODU-type. The device may identify an ODU-type associated with a spectral configuration that includes at least one property overlapping a property of the analyzed signal, and the device may determine that the ODU is of the identified ODU-type. In embodiments, the device may determine whether the ODU is using a passive or active configuration.

20 Claims, 4 Drawing Sheets

SIGNAL ANALYSIS FOR DETERMINING OUTDOOR ELECTRONIC UNIT CONFIGURATION

CROSS REFERENCE TO RELATED APPLICATION

This application is a non-provisional application claiming the benefit of U.S. Provisional Application Ser. No. 62/168,243, entitled "Satellite Receiver Installation," which was filed on May 29, 2015, and is incorporated herein by reference in its entirety.

TECHNICAL FIELD

This disclosure relates to detecting a configuration of an outdoor electronic unit.

BACKGROUND

To assist with satellite receiver installation and remote diagnostics, there is a need to determine the type and configuration of an outdoor electronic unit (ODU) that is located at a satellite installation site. If a satellite set top box (STB) unit is incorrectly configured to the ODU, the STB unit may receive deteriorated or no audio/video services. Moreover, customer support centers generally do not have accurate site equipment records.

Satellite outdoor electronics arrangements may include a passive unit, an active unit or a combination of both. Active units include units having a CSS (channel stacking switch) arrangement. There is a need for a solution which can determine the ODU configuration, at the STB, by analyzing the signals and behavior at the interface to the ODU.

Typically, passive ODU hardware translates satellite downlink frequencies to L band frequencies, thereby making it difficult to determine an ODU type. In general, detecting the signal level or the absence of expected frequencies does not suffice to allow a STB to determine an ODU type. Moreover, STBs are unable to reliably determine an ODU type through an examination of the frequency spectrums for the ODUs combined with power measurements at non overlapping frequencies. Further, during low signal scenarios or when spurious frequency components are present, the STB may be unable, or it may become difficult for the STB to draw conclusions about the ODU type. Therefore, it is desirable to improve upon methods and systems for detecting a configuration and type of ODU that is servicing a STB.

BRIEF DESCRIPTION OF THE DRAWINGS

Like reference numbers and designations in the various drawings indicate like elements.

DETAILED DESCRIPTION

Methods, systems, and computer readable media can be operable to facilitate the determination of an outdoor electronic unit (ODU)-type based upon a signal analysis. A device may perform an analysis of a signal received from an ODU, wherein the analysis identifies one or more properties of the signal, the properties including a peak frequency of the signal. The device may then compare the identified signal properties to one or more properties of one or more predetermined spectral configurations, each spectral configuration being associated with an ODU-type. The device may identify an ODU-type associated with a spectral configuration that includes at least one property overlapping a property of the analyzed signal, and the device may determine that the ODU is of the identified ODU-type. In embodiments, the device may determine whether the ODU is using a passive or active configuration.

An embodiment of the invention described herein may include a method comprising: (a) receiving a signal from an outdoor electronic unit; (b) determining one or more properties of the signal by performing an analysis on the signal; (c) comparing the one or more properties of the signal to one or more properties of one or more spectral configurations, wherein each respective one of the one or more spectral configurations is associated with a type of outdoor electronic unit; and (d) based on a determination that one or more properties of the signal overlap one or more properties of at least one of the one or more spectral configurations: (i) identifying one of the at least one spectral configurations having one or more properties that overlap one or more properties of the signal; (ii) identifying a type of outdoor electronic unit associated with the identified spectral configuration; and (iii) determining that the outdoor electronic unit is of the identified type of outdoor electronic unit.

According to an embodiment of the invention, the analysis performed on the signal comprises: (a) detecting one or more peak frequencies of the received signal; and (b) detecting a modulation associated with the received signal.

According to an embodiment of the invention, the one or more properties of the signal comprise at least a peak frequency of the received signal.

According to an embodiment of the invention, the method described herein further comprises: (a) based on a determination that none of the one or more properties of the signal overlap one or more properties of at least one of the one or more spectral configurations: (i) determining that the outdoor electronic unit is configured with an active scheme; (ii) identifying one or more frequency ranges that are allocated to a userband; (iii) determining one or more properties of the signal by performing an analysis on the signal within the one or more frequency ranges that are allocated to the userband; and (iv) determining that the outdoor electronic unit is of a type of outdoor electronic unit that is associated with a spectral configuration having one or more properties that overlap the determined one or more properties.

According to an embodiment of the invention, determining that the outdoor electronic unit is configured with an active scheme comprises determining that channel stacking switch is enabled at the outdoor electronic unit.

According to an embodiment of the invention, determining that the outdoor electronic unit is configured with an active scheme comprises successfully exchanging one or more protocol requests or queries with the outdoor electronic unit.

According to an embodiment of the invention, the one or more properties of one or more spectral configurations and the associations between the one or more spectral configurations and the one or more outdoor electronic unit types are stored at a device receiving the signal from the outdoor electronic unit.

An embodiment of the invention described herein may include an apparatus comprising: (a) an interface configured to be used to receive a signal from an outdoor electronic unit; and (b) one or more modules configured to: (i) determine one or more properties of the signal by performing an analysis on the signal; (ii) compare the one or more properties of the signal to one or more properties of one or more spectral configurations, wherein each respective one of the one or more spectral configurations is associated with a type of outdoor electronic unit; and (iii) based on a determination that one or more properties of the signal overlap one or more properties of at least one of the one or more spectral configurations: (1) identify one of the at least one spectral configurations having one or more properties that overlap one or more properties of the signal; (2) identify a type of outdoor electronic unit associated with the identified spectral configuration; and (3) determine that the outdoor electronic unit is of the identified type of outdoor electronic unit.

According to an embodiment of the invention, the one or modules are further configured to: (a) based on a determination that none of the one or more properties of the signal overlap one or more properties of at least one of the one or more spectral configurations: (i) determine that the outdoor electronic unit is configured with an active scheme; (ii) identify one or more frequency ranges that are allocated to a userband; (iii) determine one or more properties of the signal by performing an analysis on the signal within the one or more frequency ranges that are allocated to the userband; and (iv) determine that the outdoor electronic unit is of a type of outdoor electronic unit that is associated with a spectral configuration having one or more properties that overlap the determined one or more properties.

An embodiment of the invention described herein may include one or more non-transitory computer readable media having instructions operable to cause one or more processors to perform the operations comprising: (a) receiving a signal from an outdoor electronic unit; (b) determining one or more properties of the signal by performing an analysis on the signal; (c) comparing the one or more properties of the signal to one or more properties of one or more spectral configurations, wherein each respective one of the one or more spectral configurations is associated with a type of outdoor electronic unit; and (d) based on a determination that one or more properties of the signal overlap one or more properties of at least one of the one or more spectral configurations: (i) identifying one of the at least one spectral configurations having one or more properties that overlap one or more properties of the signal; (ii) identifying a type of outdoor electronic unit associated with the identified spectral configuration; and (iii) determining that the outdoor electronic unit is of the identified type of outdoor electronic unit.

According to an embodiment of the invention, the instructions are further operable to cause the one or more processors to perform the operations comprising: (a) based on a determination that none of the one or more properties of the signal overlap one or more properties of at least one of the one or more spectral configurations: (i) determining that the outdoor electronic unit is configured with an active scheme; (ii) identifying one or more frequency ranges that are allocated to a userband; (iii) determining one or more properties of the signal by performing an analysis on the signal within the one or more frequency ranges that are allocated to the userband; and (iv) determining that the outdoor electronic unit is of a type of outdoor electronic unit that is associated with a spectral configuration having one or more properties that overlap the determined one or more properties.

Figure 1:
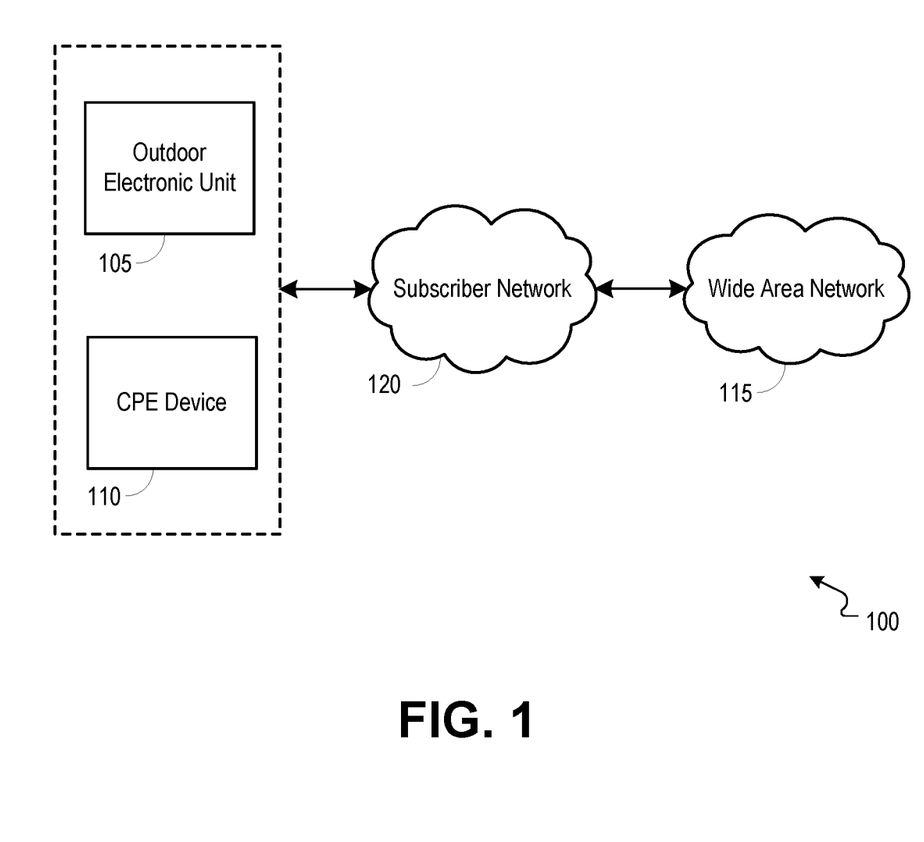
FIG. 1 is a block diagram illustrating an example network environment operable to facilitate the determination of an ODU-type based upon a signal analysis.

FIG. 1 is a block diagram illustrating an example network environment 100 operable to facilitate the determination of an ODU-type based upon a signal analysis. In embodiments, one or more services (e.g., video, data, voice, etc.) may be received at a subscriber premise by an outdoor electronic unit (ODU) 105. The ODU 105 may include a satellite dish positioned at the exterior of the subscriber premise. For example, the ODU 105 may receive a satellite signal carrying one or more services over a satellite link, and the ODU 105 may translate the satellite signal into a signal that is delivered to one or more customer premise equipment (CPE) devices 110. CPE devices 110 can include a wide variety of devices such as set-top boxes, multimedia gateway devices, data routers (wired or wireless routers), televisions, mobile devices, tablets, computers, telephones, security devices, and any other device that is capable of utilizing a video, data, telephony, or other service.

The ODU 105 may receive the one or more services from a wide area network 115 (e.g., network of content, application, and data servers) through a connection to a subscriber network 120. The subscriber network 120 may include satellite networks delivering the one or more services via satellite signals passed to the ODU 105. ODU hardware may translate satellite downlink frequencies to L band frequencies for delivery to the CPE device 110.

In embodiments, the CPE device 110 may be configured to analyze a signal received from an ODU 105. The CPE device 110 may carry out a peak frequency detection in combination with a modulation detection to determine relative frequency components and other properties of the signal received from the ODU 105. The CPE device 110 may identify one or more test frequency ranges within which to locate one or more peak frequency components, and the CPE device 110 may then examine relative frequency power levels within the test frequency ranges to determine the peak frequencies. Modulation characteristics may then be tested by the CPE device 110 after the one or more peak frequencies are identified.

In embodiments, having identified peak frequency, modulation, and/or other properties of a signal received from the ODU 105, the CPE device 110 may compare the identified properties to one or more properties of a predetermined signal test model. For example, one or more spectral configurations of available ODU types may be loaded and stored at the CPE device 110 or at remote storage (e.g., another device within a subscriber premise, a remote server within an upstream network, etc.). It should be understood that the spectral configurations may be determined and stored by the CPE device 110 via signal analysis performed on signals received from ODUs of known ODU types, or the spectral configurations may be loaded onto the CPE device 110 by a subscriber, technician, or operator, or the spectral configurations may be retrieved by the CPE device 110 from a remote server or from some other source. The CPE device 110 may be configured to identify any overlapping properties between the properties identified from the received signal and the properties of the one or more spectral configurations associated with the ODU types. If a spectral configuration having one or more properties that overlap the properties identified from the received signal is identified, the CPE device 110 may determine that the ODU 105 is of an ODU-type that is associated with the spectral configuration.

In embodiments, if none of the spectral configurations have at least one property that overlaps at least one property identified from the received signal, the CPE device 110 may determine whether the ODU 105 is configured with an active scheme (e.g., channel stacking switch (CSS) enabled). The CPE device 110 may attempt to exchange a series of known protocol request/queries with the ODU 105. If the exchange of protocol request/queries is successful, the ODU 105 may be instructed to translate test frequency ranges to an allocated CSS userband, and the CPE device 110 may carry out another analysis (e.g., peak frequency detection in combination with a modulation detection) on the signal received from the ODU 105 within the CSS userband. If the exchange of protocol request/queries is unsuccessful, the CPE device 110 may determine that an identification of the ODU-type is inconclusive.

Figure 2:
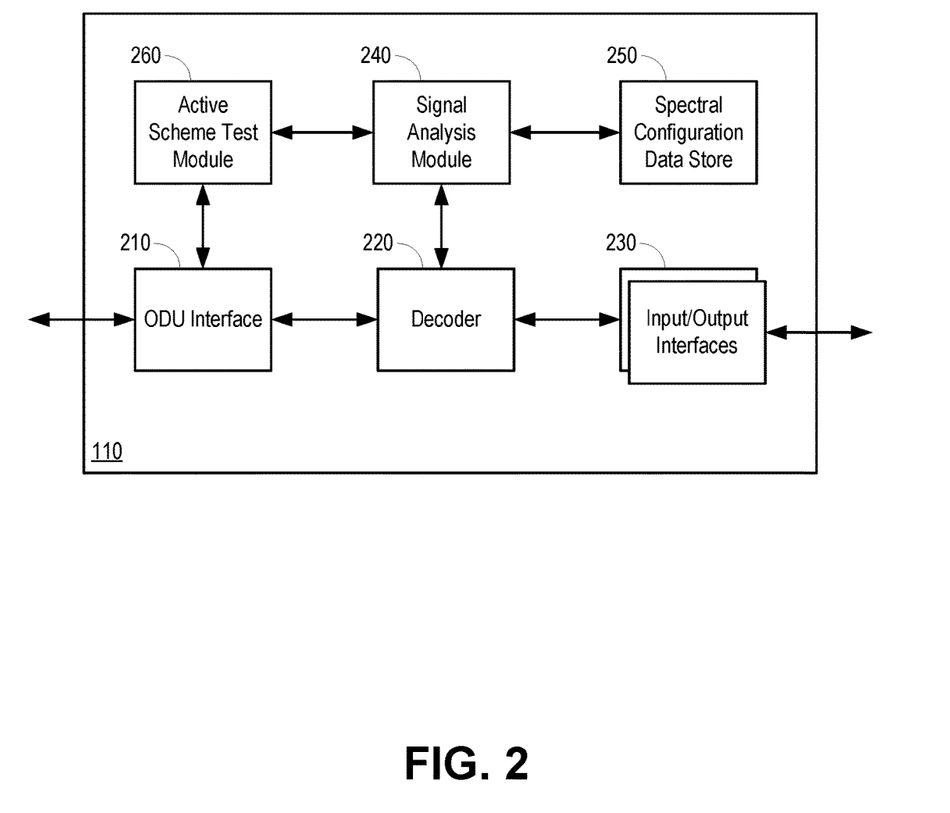
FIG. 2 is a block diagram illustrating an example CPE device operable to facilitate the determination of an ODU-type based upon a signal analysis.

FIG. 2 is a block diagram illustrating an example CPE device 110 operable to facilitate the determination of an ODU-type based upon a signal analysis. The CPE device 110 may include an ODU interface 210, a decoder 220, one or more input/output interfaces 230, a signal analysis module 240, a spectral configuration data store 250, and an active scheme test module 260. The CPE device 110 may be any device configured to communicate with and/or to receive one or more services from an ODU (e.g., ODU 105 of FIG. 1).

In embodiments, the CPE device 110 may receive communications and services from an ODU 105 through the ODU interface 210. For example, hardware at the ODU 105 may translate satellite downlink frequencies to L band frequencies for delivery to the CPE device 110. The CPE device 110 may process the received communications and services through the decoder 220 and may deliver the communications and services to a subscriber (e.g., display) through the one or more input/output interfaces 230. The CPE device 110 may receive communications such as commands and requests from a user through the one or more input/output interfaces 230.

In embodiments, the signal analysis module 240 may be configured to analyze a signal received from an ODU 105. For example, the signal analysis module 240 may include a peak frequency detection mechanism and a modulation detection mechanism. The signal analysis module 240 may carry out a peak frequency detection in combination with a modulation detection to determine relative frequency components and other properties of the signal received from the ODU 105. The signal analysis module 240 may identify one or more test frequency ranges within which to locate one or more peak frequency components, and the signal analysis module 240 may then examine relative frequency power levels within the test frequency ranges to determine the peak frequencies. Modulation characteristics may then be tested by the CPE device 110 after the one or more peak frequencies are identified.

In embodiments, having identified peak frequency, modulation, and/or other properties of a signal received from the ODU 105, the signal analysis module 240 may compare the identified properties to one or more properties of a predetermined signal test model. For example, one or more spectral configurations of available ODU types may be loaded and stored at the spectral configuration data store 250 or at remote storage (e.g., another device within a subscriber premise, a remote server within an upstream network, etc.). It should be understood that the spectral configurations may be determined and stored at the spectral configuration data store 250 via signal analysis performed on signals received from ODUs of known ODU types, or the spectral configurations may be loaded onto the CPE device 110 by a subscriber, technician, or operator, or the spectral configurations may be retrieved by the CPE device 110 from a remote server or from some other source. The spectral configuration data store 250 may be configured with spectral configurations of ODU-types via a set of factory default values, or via another configuration schema (e.g., simple network management protocol (SNMP), TR69, WebGUI, etc.).

The signal analysis module 240 may be configured to identify any overlapping properties between the properties identified from the received signal and the properties of the one or more spectral configurations associated with the ODU types. If a spectral configuration having one or more properties that overlap the properties identified from the received signal is identified, the signal analysis module 240 may determine that the ODU 105 is of an ODU-type that is associated with the spectral configuration.

In embodiments, if none of the spectral configurations have at least one property that overlaps at least one property identified from the received signal, the active scheme test module 260 may determine whether the ODU 105 is configured with an active scheme (e.g., channel stacking switch (CSS) enabled). The active scheme test module 260 may attempt to exchange a series of known protocol request/queries with the ODU 105 through the ODU interface 210. If the exchange of protocol request/queries is successful, the ODU 105 may be instructed to translate test frequency ranges to an allocated CSS userband, and the signal analysis module 240 may carry out another analysis (e.g., peak frequency detection in combination with a modulation detection) on the signal received from the ODU 105 within the CSS userband. If the exchange of protocol request/queries is unsuccessful, the signal analysis module 240 may determine that an identification of the ODU-type is inconclusive.

Figure 3:
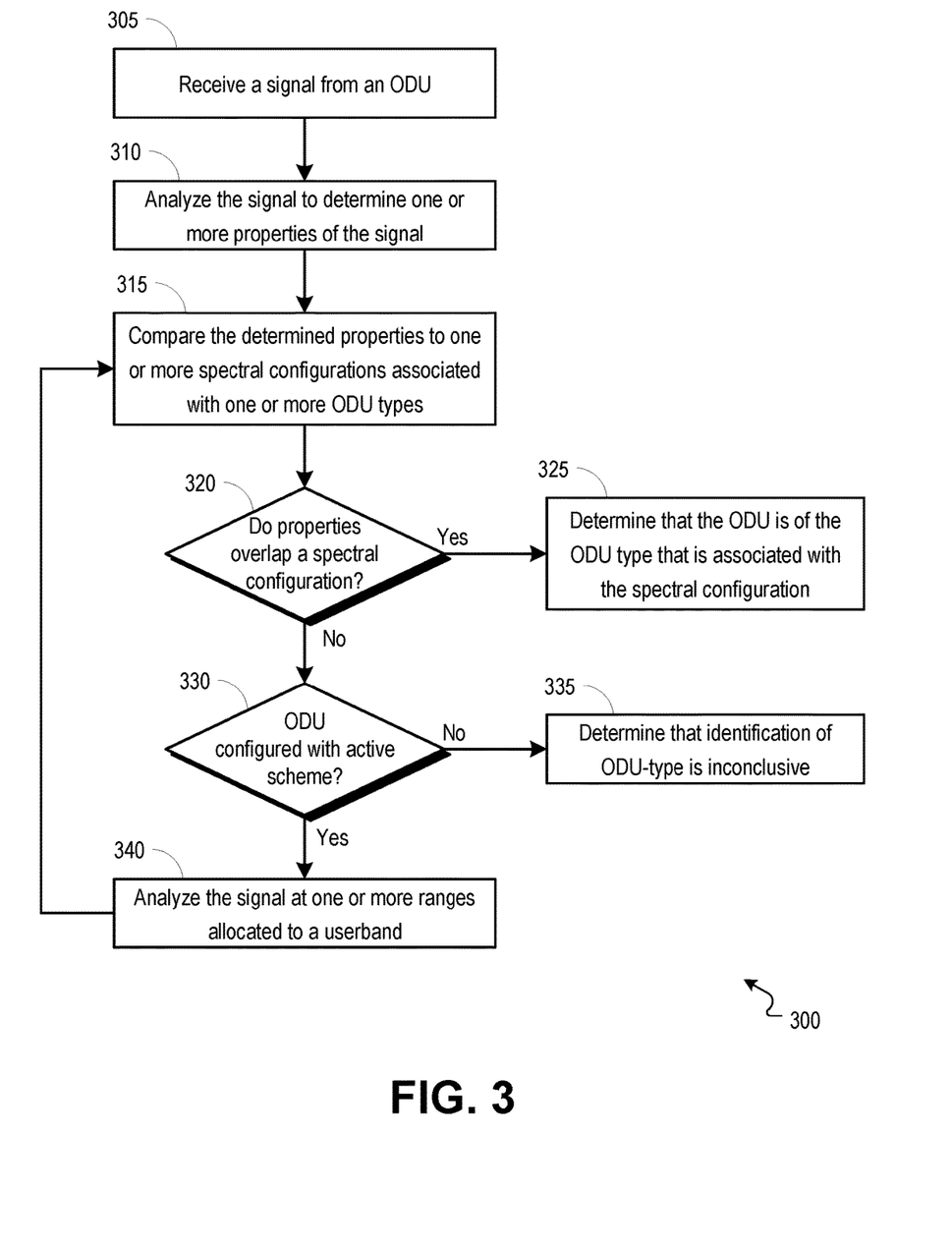
FIG. 3 is a flowchart illustrating an example process operable to facilitate the determination of an ODU-type based upon a signal analysis.

FIG. 3 is a flowchart illustrating an example process 300 operable to facilitate the determination of an ODU-type based upon a signal analysis. In embodiments, the process 300 may be carried out by a CPE device 110 of FIG. 1. The process 300 may start at 305, when a signal is received at a CPE device 110 from an ODU (e.g., ODU 105 of FIG. 1). The process 300 may be initiated by a request for a determination of the type of ODU associated with the CPE device 110, and the request may be generated by subscriber or technician input, or by a service provider (e.g., digital broadcast satellite (DBS) operator, multiple systems operator (MSO), etc.).

At 310, the received signal may be analyzed to determine one or more properties of the signal. The signal may be analyzed, for example, by the signal analysis module 240 of FIG. 2. In embodiments, the signal analysis module 240 may perform a spectrum configuration evaluation on the received signal. For example, the signal analysis module 240 may determine relative frequency components and other properties of the received signal. The spectrum configuration evaluation may include a peak frequency detection combined with a modulation detection. The signal analysis module 240 may identify a test range of frequencies (i.e., frequencies identified by predetermined spectral configurations associated with one or more ODU types) in which to locate the peak frequency component, and the signal analysis module 240 may examine the relative frequency power levels in the test range to determine the peak frequency.

Once a peak frequency is identified, the modulation characteristics may then be tested by the signal analysis module 240.

At 315, the determined one or more properties of the received signal may be compared to one or more spectral configuration associated with one or more ODU types. For example, the signal analysis module 240 of FIG. 2 may compare the one or more properties of the received signal to one or more stored spectral configurations associated with one or more ODU types (e.g., spectral configurations stored at a spectral configuration data store 250 of FIG. 2, or remote storage that is external to the subject CPE device 110). It will be appreciated by those skilled in the relevant art that various techniques may be used for determining the one or more frequency ranges to be tested. For example, frequency ranges and signal configurations of ODU-types may be determined by analyzing frequency translation properties of known ODU-types. It should be understood that the one or more spectral configurations may be pre-loaded onto the CPE device 110 or may be communicated to the CPE device 110 as a configuration parameter or as an upgrade. Thus, the one or more spectral configurations may be upgraded at the CPE device 110 in response to changes in specifications used for service delivery.

At 320, a determination may be made whether one or more of the determined properties of the received signal overlap properties of a spectral configuration. The determination whether an overlap between one or more properties of the received signal and one or more properties of the spectral configuration exists may be made, for example, by the signal analysis module 240 of FIG. 2. In embodiments, the signal analysis module 240 may compare the determined peak frequency for each of one or more frequency ranges of the received signal to a predetermined peak frequency of a corresponding frequency range of each of one or more spectral configurations. For example, the signal analysis module 240 may search for frequency components of a signal that match a previously identified frequency range of interest. If a component of interest is matched to a previously identified frequency range of interest, the signal analysis module 240 may check modulation properties of the signal, and if the modulation properties match a component of interest, the determination may be made that properties of the received signal overlap properties of a spectral configuration. It should be understood that where a peak frequency is determined for each of a plurality of frequency ranges of the received signal, multiple overlaps between the determined peak frequencies and peak frequencies of a spectral configuration may be identified by the signal analysis module 240.

If, at 320, the determination is made that one or more of the determined properties of the received signal overlap one or more properties of a spectral configuration, the process 300 may proceed to 325. At 325, the determination may be made that the ODU from which the signal was received is of the ODU type that is associated with the spectral configuration. In some instances, where a peak frequency is determined for each of a plurality of frequency ranges of the received signal, and overlaps between the determined peak frequencies and peak frequencies of multiple spectral configurations are identified, the determined ODU type may be the ODU type associated with the spectral configuration having the highest number of peak frequency overlaps with the peak frequencies determined for the received signal. With knowledge of a correct ODU type, automatic configuration of the CPE device 110 may be enabled by allowing the CPE device 110 to adjust configuration parameters according to requirements of the ODU type. The determined ODU type may be presented to a user or installer to assist with installation and/or diagnostics.

If, at 320, the determination is made that none of the determined properties of the received signal overlap one or more properties of a spectral configuration, the process 300 may proceed to 330. At 330, a determination may be made whether the ODU from which the signal was received is configured with an active scheme. The determination whether the ODU is configured with an active scheme (e.g., channel stacking switch (CSS) enabled) may be made, for example, by an active scheme test module 260 of FIG. 2. In embodiments, the active scheme test module 260 may initiate an exchange of one or more protocol requests or queries with the ODU. If the exchange of one or more protocol requests or queries with the ODU is unsuccessful, the active scheme test module 260 may determine that the ODU is not configured with an active scheme, and, at 335, the determination may be made that the identification of the ODU-type is inconclusive. If the exchange of one or more protocol requests or queries with the ODU is successful, the active scheme test module 260 may determine that the ODU is configured with an active scheme, and the process 300 may proceed to 340.

At 340, the signal received from the ODU may be analyzed at one or more frequency ranges allocated to a userband. The active scheme test module 260 may output an instruction to the ODU to translate the test frequency ranges to an allocated CSS userband. In embodiments, the signal analysis module 240 may analyze the signal received from the ODU at the one or more test frequency ranges within the CSS userband to determine one or more properties of the signal. For example, the signal analysis module 240 may determine relative frequency components (e.g., peak frequency) and other properties of the received signal by performing a spectrum configuration evaluation on the signal at the one or more test frequency ranges of the CSS userband. The spectrum configuration evaluation may include a peak frequency detection combined with a modulation detection. Once a peak frequency is identified, the modulation characteristics may then be tested by the signal analysis module 240, and the process 300 may return to 315. It should be understood that after the determination is made that the ODU is configured with an active scheme, if the determined properties still do not overlap a spectral configuration, 330 may be skipped, and the determination may be made that identification of ODU-type is inconclusive at 335.

Figure 4:
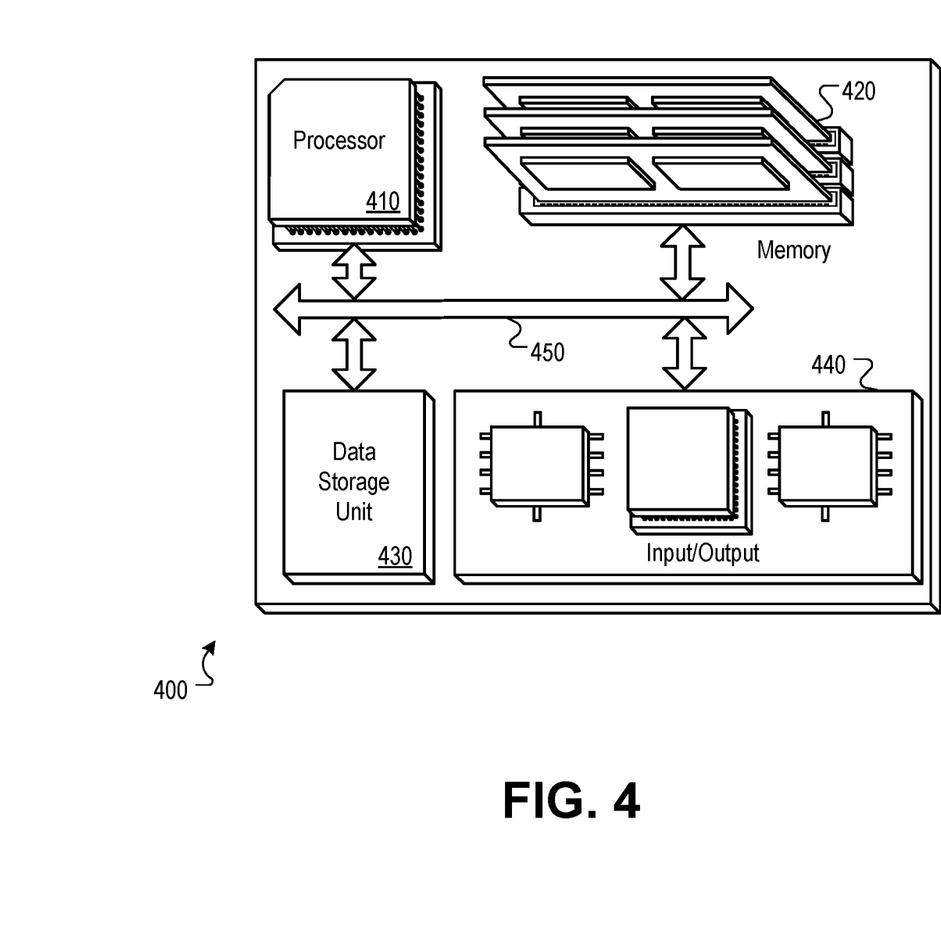
FIG. 4 is a block diagram of a hardware configuration operable to facilitate the determination of an ODU-type based upon a signal analysis.

FIG. 4 is a block diagram of a hardware configuration 400 operable to facilitate the determination of an ODU-type based upon a signal analysis. It should be understood that the hardware configuration 400 can exist in various types of devices. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., subscriber network 120 of FIG. 1, WAN 115 of FIG. 1, etc.) and/or one or more receiver and/or transmitter components (e.g., ODU 105 of FIG. 1) via one or more service sets. It should be understood that the communications protocols described herein are only examples and that various other inter-chip communication protocols may be used to support the methods, systems, and computer readable media described herein.

Those skilled in the art will appreciate that the invention improves upon methods and apparatuses for determining a type of ODU delivering communications and services to a device. Methods, systems, and computer readable media can be operable to facilitate the determination of an outdoor electronic unit (ODU)-type based upon a signal analysis. A device may perform an analysis of a signal received from an ODU, wherein the analysis identifies one or more properties of the signal, the properties including a peak frequency of the signal. The device may then compare the identified signal properties to one or more properties of one or more predetermined spectral configurations, each spectral configuration being associated with an ODU-type. The device may identify an ODU-type associated with a spectral configuration that includes at least one property overlapping a property of the analyzed signal, and the device may determine that the ODU is of the identified ODU-type. In embodiments, the device may determine whether the ODU is using a passive or active configuration.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a signal from an outdoor electronic unit, wherein the signal is received at a customer premise equipment device;
   determining, at the customer premise equipment device, one or more properties of the signal by performing an analysis on the signal;
   comparing the one or more properties of the signal to one or more properties of one or more spectral configurations, wherein each respective one of the one or more spectral configurations is associated with a type of outdoor electronic unit; and
   based on a determination that one or more properties of the signal overlap one or more properties of at least one of the one or more spectral configurations:
   identifying one of the at least one spectral configurations having one or more properties that overlap one or more properties of the signal;
   identifying a type of outdoor electronic unit associated with the identified spectral configuration; and
   based upon the identification of the type of outdoor electronic unit associated with the identified spectral configuration, determining that the outdoor electronic unit from which the customer premise equipment device received the signal is the same type of outdoor electronic unit as the identified type of outdoor electronic unit.

2. The method of claim 1, wherein the analysis performed on the signal comprises:
   detecting one or more peak frequencies of the received signal; and
   detecting a modulation associated with the received signal.

3. The method of claim 1, wherein the one or more properties of the signal comprise at least a peak frequency of the received signal.

4. The method of claim 1, further comprising:
   based on a determination that none of the one or more properties of the signal overlap one or more properties of at least one of the one or more spectral configurations:
   determining that the outdoor electronic unit is configured with an active scheme;
   identifying one or more frequency ranges that are allocated to a userband;
   determining one or more properties of the signal by performing an analysis on the signal within the one or more frequency ranges that are allocated to the userband; and
   determining that the outdoor electronic unit is of a type of outdoor electronic unit that is associated with a spectral configuration having one or more properties that overlap the determined one or more properties.

5. The method of claim 4, wherein determining that the outdoor electronic unit is configured with an active scheme comprises:
   determining that channel stacking switch is enabled at the outdoor electronic unit.

6. The method of claim 4, wherein determining that the outdoor electronic unit is configured with an active scheme comprises:
   successfully exchanging one or more protocol requests or queries with the outdoor electronic unit.

7. The method of claim 1, wherein the one or more properties of one or more spectral configurations and the associations between the one or more spectral configurations and the one or more outdoor electronic unit types are stored at a device receiving the signal from the outdoor electronic unit.

8. A customer premise equipment device comprising:
   an interface configured to be used to receive a signal from an outdoor electronic unit; and
   one or more modules configured to:
   determine one or more properties of the signal by performing an analysis on the signal;
   compare the one or more properties of the signal to one or more properties of one or more spectral configurations, wherein each respective one of the one or more spectral configurations is associated with a type of outdoor electronic unit; and
   based on a determination that one or more properties of the signal overlap one or more properties of at least one of the one or more spectral configurations:
   identify one of the at least one spectral configurations having one or more properties that overlap one or more properties of the signal;
   identify a type of outdoor electronic unit associated with the identified spectral configuration; and
   based upon the identification of the type of outdoor electronic unit associated with the identified spectral configuration, determine that the outdoor electronic unit from which the signal is received is the same type of outdoor electronic unit as the identified type of outdoor electronic unit.

9. The apparatus of claim 8, wherein the analysis performed on the signal comprises:
   detecting one or more peak frequencies of the received signal; and
   detecting a modulation associated with the received signal.

10. The apparatus of claim 8, wherein the one or more properties of the signal comprise at least a peak frequency of the received signal.

11. The apparatus of claim 8, wherein the one or modules are further configured to:
    based on a determination that none of the one or more properties of the signal overlap one or more properties of at least one of the one or more spectral configurations:
    determine that the outdoor electronic unit is configured with an active scheme;
    identify one or more frequency ranges that are allocated to a userband;
    determine one or more properties of the signal by performing an analysis on the signal within the one or more frequency ranges that are allocated to the userband; and
    determine that the outdoor electronic unit is of a type of outdoor electronic unit that is associated with a spectral configuration having one or more properties that overlap the determined one or more properties.

12. The apparatus of claim 11, wherein determining that the outdoor electronic unit is configured with an active scheme comprises:
determining that channel stacking switch is enabled at the outdoor electronic unit.

13. The apparatus of claim 11, wherein determining that the outdoor electronic unit is configured with an active scheme comprises:
successfully exchanging one or more protocol requests or queries with the outdoor electronic unit.

14. One or more non-transitory computer readable media having instructions operable to cause one or more processors to perform the operations comprising:
receiving a signal from an outdoor electronic unit, wherein the signal is received at a customer premise equipment device;
determining, at the customer premise equipment device, one or more properties of the signal by performing an analysis on the signal;
comparing the one or more properties of the signal to one or more properties of one or more spectral configurations, wherein each respective one of the one or more spectral configurations is associated with a type of outdoor electronic unit; and
based on a determination that one or more properties of the signal overlap one or more properties of at least one of the one or more spectral configurations:
identifying one of the at least one spectral configurations having one or more properties that overlap one or more properties of the signal;
identifying a type of outdoor electronic unit associated with the identified spectral configuration; and
based upon the identification of the type of outdoor electronic unit associated with the identified spectral configuration, determining that the outdoor electronic unit from which the customer premise equipment device received the signal is the same type of outdoor electronic unit as the identified type of outdoor electronic unit.

15. The one or more non-transitory computer-readable media of claim 14, wherein the analysis performed on the signal comprises:
detecting one or more peak frequencies of the received signal; and
detecting a modulation associated with the received signal.

16. The one or more non-transitory computer-readable media of claim 14, wherein the one or more properties of the signal comprise at least a peak frequency of the received signal.

17. The one or more non-transitory computer-readable media of claim 14, wherein the instructions are further operable to cause the one or more processors to perform the operations comprising:
based on a determination that none of the one or more properties of the signal overlap one or more properties of at least one of the one or more spectral configurations:
determining that the outdoor electronic unit is configured with an active scheme;
identifying one or more frequency ranges that are allocated to a userband;
determining one or more properties of the signal by performing an analysis on the signal within the one or more frequency ranges that are allocated to the userband; and
determining that the outdoor electronic unit is of a type of outdoor electronic unit that is associated with a spectral configuration having one or more properties that overlap the determined one or more properties.

18. The one or more non-transitory computer-readable media of claim 17, wherein determining that the outdoor electronic unit is configured with an active scheme comprises:
determining that channel stacking switch is enabled at the outdoor electronic unit.

19. The one or more non-transitory computer-readable media of claim 17, wherein determining that the outdoor electronic unit is configured with an active scheme comprises:
successfully exchanging one or more protocol requests or queries with the outdoor electronic unit.

20. The one or more non-transitory computer-readable media of claim 14, wherein the one or more properties of one or more spectral configurations and the associations between the one or more spectral configurations and the one or more outdoor electronic unit types are stored at a device receiving the signal from the outdoor electronic unit.

* * * * *